United States Patent
Park et al.

(10) Patent No.: US 10,762,030 B2
(45) Date of Patent: Sep. 1, 2020

(54) STORAGE SYSTEM, METHOD, AND APPARATUS FOR FAST IO ON PCIE DEVICES

(71) Applicant: Samsung Electronics Co., Ltd., Suwon-si, Gyeonggi-do (KR)

(72) Inventors: Heekwon Park, Pleasanton, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 535 days.

(21) Appl. No.: 15/227,961

(22) Filed: Aug. 4, 2016

(65) Prior Publication Data

US 2017/0344510 A1    Nov. 30, 2017

Related U.S. Application Data

(60) Provisional application No. 62/341,604, filed on May 25, 2016.

(51) Int. Cl.
*G06F 13/42* (2006.01)
*G06F 13/28* (2006.01)
*G06F 12/0811* (2016.01)

(52) U.S. Cl.
CPC ...... *G06F 13/4282* (2013.01); *G06F 12/0811* (2013.01); *G06F 13/28* (2013.01); *G06F 2212/283* (2013.01)

(58) Field of Classification Search
None
See application file for complete search history.

(56) References Cited

U.S. PATENT DOCUMENTS

| | | | |
|---|---|---|---|
| 6,424,621 B1 * | 7/2002 | Ramaswamy | H04L 45/24 370/230 |
| 6,510,164 B1 * | 1/2003 | Ramaswamy | H04L 45/00 370/235 |
| 6,651,131 B1 * | 11/2003 | Chong, Jr. | G06F 3/061 709/220 |
| 8,745,292 B2 | 6/2014 | Lais et al. | |
| 8,819,304 B2 | 8/2014 | Shapiro et al. | |
| 8,874,833 B1 * | 10/2014 | Gole | G06F 12/0246 711/103 |
| 9,098,423 B2 | 8/2015 | Cho | |

(Continued)

*Primary Examiner* — Henry Tsai
*Assistant Examiner* — Christopher A Bartels
(74) *Attorney, Agent, or Firm* — Renaissance IP Law Group LLP (57) ABSTRACT

Embodiments of systems and methods for fast input/output (IO) on PCIE devices are described. Such methods include receiving an IO request from a user or application, the IO request comprising instructions for communicating data with a host system, the host system comprising a processing device and a memory device, analyzing information from the IO request in an IO block analyzer to select one of a plurality of communication paths for communicating the data with the host system, defining a routing instruction in a transfer routing information transmitter in response to the selected communication path, communicating the routing instruction in a Transaction Layer Packet (TLP) to an integrated IO (IIO) module of the host system routing the data from the peripheral device to either the processing device or the memory device according to the routing instruction with a data transfer router.

20 Claims, 10 Drawing Sheets

(56) References Cited

U.S. PATENT DOCUMENTS

| | | | | |
|---|---|---|---|---|
| 9,432,298 B1* | 8/2016 | Smith | .................. | H04L 49/9057 |
| 9,977,754 B2* | 5/2018 | Kim | ........................ | G06F 13/28 |
| 2001/0049744 A1* | 12/2001 | Hussey | ................. | H04L 69/161 |
| | | | | 709/238 |
| 2002/0188875 A1* | 12/2002 | Hwang | ............... | H04L 41/0803 |
| | | | | 713/300 |
| 2003/0097481 A1* | 5/2003 | Richter | ................... | H04L 29/06 |
| | | | | 709/251 |
| 2007/0064725 A1* | 3/2007 | Minami | .................. | H04L 29/06 |
| | | | | 370/463 |
| 2011/0246686 A1 | 10/2011 | Cavanagh, Jr. et al. | | |
| 2013/0311817 A1* | 11/2013 | Kim | ........................ | G06F 1/04 |
| | | | | 713/501 |
| 2014/0189427 A1* | 7/2014 | Jayaprakash Bharadwaj | .............. | |
| | | | | G06F 11/1415 |
| | | | | 714/15 |
| 2014/0198790 A1* | 7/2014 | Christenson | ........ | H04L 43/0811 |
| | | | | 370/392 |
| 2015/0180782 A1* | 6/2015 | Rimmer | ................. | H04L 69/22 |
| | | | | 370/236 |
| 2016/0095110 A1* | 3/2016 | Li | ..................... | H04W 72/1215 |
| | | | | 370/329 |
| 2016/0378545 A1* | 12/2016 | Ho | ........................... | G06F 9/50 |
| | | | | 718/107 |
| 2017/0091108 A1* | 3/2017 | Arellano | ............. | G06F 12/0888 |
| 2017/0206166 A1* | 7/2017 | Kumar | ................ | G06F 12/0888 |
| 2018/0063555 A1* | 3/2018 | Raduchel | ........... | H04N 21/2181 |

\* cited by examiner

STORAGE SYSTEM, METHOD, AND APPARATUS FOR FAST IO ON PCIE DEVICES

RELATED APPLICATION DATA

This application claims the priority benefit under 35 U.S.C. § 119(e) of U.S. Patent Application Ser. No. 62/341,604, filed May 25, 2016, which is hereby incorporated by reference.

FIELD

This disclosure relates generally to data handling systems, and more specifically, to storage systems, methods, and apparatuses for fast input/output (IO) on PCIE devices.

BACKGROUND

Data handling systems, such as computer systems, generally include a host system with several core components, including a central processing unit (CPU), a memory device, IO devices, and a device interconnect or root complex for transferring information between components of the host system. One interconnect protocol is PCIe, which defines modes of data transfer between host system components.

Direct memory access (DMA), direct cache access (DCA), and data direct I/O (DDIO) are existing techniques to transfer data between host systems (memory or caches) and IO devices. DMA transfers data between IO devices and host system memory. DDIO transfers data between IO devices and the last level cache (LLC) of a host CPU. DCA transfers data between IO devices and host system memory similar to DMA, but after the data transfer is complete, DCA prefetches the data to the CPU caches from memory.

Host systems often include multiple data handling ports, each of which may be configured to transfer data by one of DMA, DCA or DDIO protocols. Such ports are referred to herein as "multi-ports." A common system may have some multi-ports configured for DMA, some multi-ports configured for DDIO, and possibly some multi-ports configured for DCA. Existing systems send an IO request to devices using one of these techniques (DMA, DCA, or DDIO). However, there are currently no methods to combine functional aspects of DMA, DCA, § or DDIO protocols, or to dynamically switch between protocols for reduced latency or improved throughput, depending on the applications IO request.

SUMMARY

Embodiments of storage systems, methods, and apparatuses for fast IO on PCIE devices are described. In an embodiment, a method may include receiving an IO request from a user or application, the IO request comprising instructions for communicating data with a host system, the host system comprising a processing device and a memory device. The method may also include analyzing information from the IO request in an IO block analyzer to select one of a plurality of communication paths for communicating the data with the host system. Additionally, the method may include defining a routing instruction in a transfer routing information transmitter in response to the selected communication path. Also, the method may include communicating the routing instruction in a Transaction Layer Packet (TLP) to an integrated IO (IIO) module of the host system. The method may additionally include routing the data from the peripheral device to either the processing device or the memory device according to the routing instruction with a data transfer router.

An embodiment of a system includes a peripheral device comprising an IO manager configured to: receive an IO request, the IO request comprising instructions for communicating data with a host system, the host system comprising a processing device and a memory device, analyze information from the IO request to select one of a plurality of communication paths for communicating the data with the host system, define a routing instruction in response to the selected communication path. The system may also include a data transfer device coupled to the peripheral device, and configured to communicate the routing instruction in a TLP to an IIO module of the host system.

An apparatus may include a data transfer device coupled to a peripheral device, and configured to communicate a routing instruction in a TLP to an IIO module of a host system. In such an embodiment, the routing instruction may include selection of one of a plurality of communication paths for communicating the data with the host system, the selection being determined in response to instructions included in an IO request.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of systems and methods are disclosed for fast IO on PCIe devices. In an embodiment, a PCIe device may include multiple consistent IO ports for redundancy, performance, and QoS. Additionally, the PCIe device may include a set of routing scratch pads and a packet builder. The set of routing scratch pads may be used to store routing information for each port. The packet builder may dynamically build PCIe TLPs that include routing information set in the routing scratch pad.

The present embodiments also provide an IO manager, which may be defined by system software or firmware, and that may include a transfer routing decision maker comprising an IO block analyzer and a routing information sender. The IO block analyzer may generate routing information based on data characteristics. The routing information sender may send the information to the routing scratch pad in the PCIe device via memory mapped IO (MMIO). Additionally, the PCIe device may inform the CPU to set the routing control registers using routing information dynamically.

Further disclosed herein is an integrated input/output (IIO) module that may include a routing demultiplexer to change the data paths dynamically between memory and cache, based on the routing information, and methods that control the IO flow among device, memory, and cache.

Figure 1:
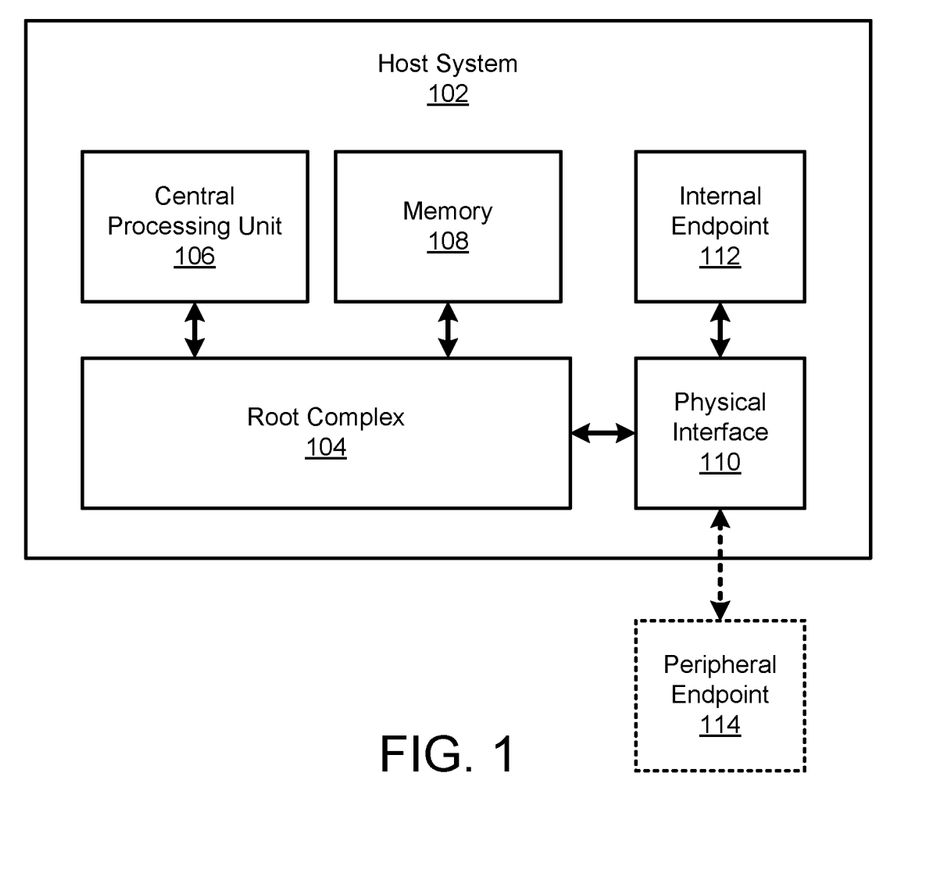
FIG. 1 is a schematic block diagram illustrating an embodiment of a system for fast IO on PCIe devices.

FIG. 1 is a schematic block diagram illustrating an embodiment of a system 100 for fast IO on PCIe devices. In an embodiment, the system 100 includes a host system 102, and optionally, one or more peripheral endpoints 114. A host system 102 may be, for example, a data handling device, such as a computer. A peripheral endpoint may be a peripheral device configured to communicate with the host system 102 over a PCIe, or similar data bus. Examples may include PCIe extension devices, data storage devices, server blades, etc.

Figure 4A:
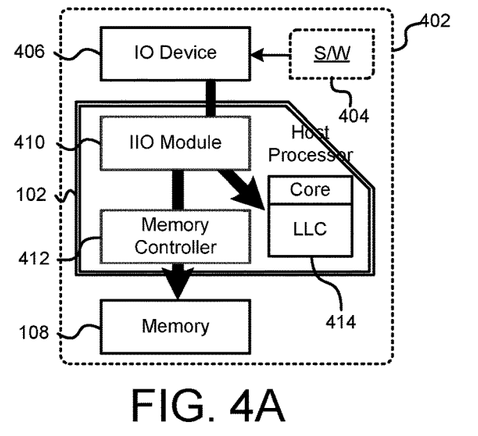
FIG. 4A is a logical diagram illustrating an embodiment of fast IO on PCIe devices.

In an embodiment, the host system 102 may include a root complex 104 which forms a data communication fabric for communicating data between the CPU 106, the memory 108 and one or more internal endpoints 112 or external endpoints 114 coupled to the root complex 104 via a physical interface 110. The root complex 104 may operate according to a data communication protocol, such as PCIe. In an embodiment, the root complex 104 and/or the physical interface 110 may include a plurality of data communication ports as illustrated in FIG. 4. The various endpoints 112, 114 may communicate data with the CPU 106 and/or the memory 108 via the root complex 104.

Figure 2:
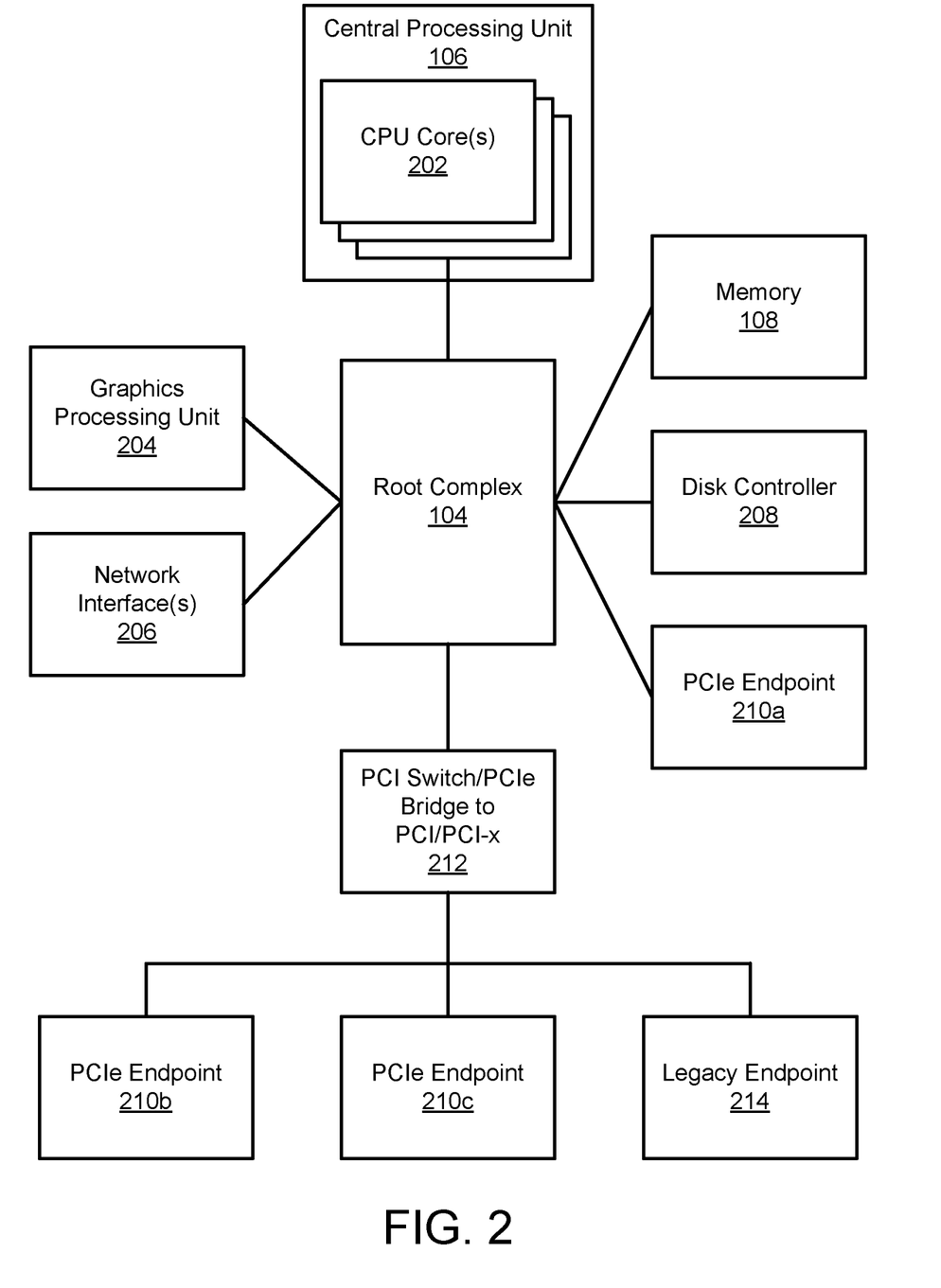
FIG. 2 is a schematic block diagram illustrating an embodiment of a system for fast IO on PCIe devices.

FIG. 2 is a schematic block diagram illustrating another embodiment of a system 200. In an embodiment, the CPU 106 may include a plurality of CPU cores 202. System 200 may similarly include a root complex 104 for communicating the data between the CPU cores 202, the memory 108, and the one or more endpoints. The term "endpoints" may include the internal endpoints 112 and the external endpoints 114 illustrated in FIG. 1. Examples of endpoints may include a Graphics Processing Unit 204, one or more network interfaces 206, a disk controller 208, and other PCIe endpoints 210a. Additionally, the system 200 may include a PCI switch/PCIe bridge to PCI/PCI-x 212. In some alternative embodiments, the PCI switch may be separate from the PCIe bridge. The PCI switch may provide switched communication to a plurality of PCIe endpoints 210b-c. The PCIe bridge may provide connectivity to legacy endpoints 214 operating according to a legacy PCI or PCI-x protocol.

Figure 3:
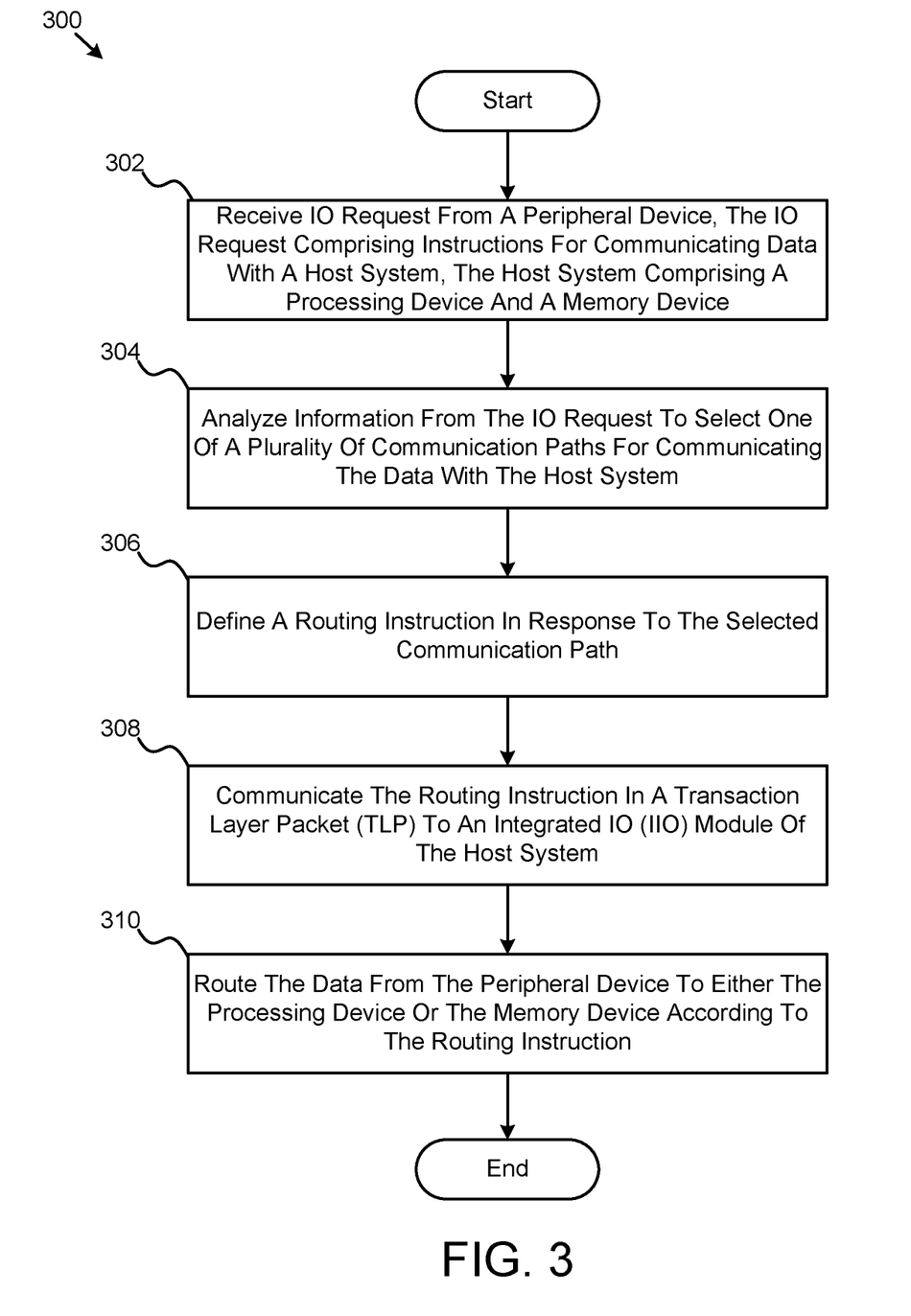
FIG. 3 is a schematic flowchart diagram illustrating an embodiment of a method for fast IO on PCIe devices.

FIG. 3 is a schematic flowchart diagram illustrating an embodiment of a method 300 for fast IO on PCIe devices. In an embodiment, the method 300 includes receiving an IO request from a user or application, where the IO request includes instructions for communicating data with a host system 102 that has a processing device, such as CPU 106, and a memory device 108, as shown at block 302. At block 304, the method 300 may include analyzing information from the IO request to select one of a plurality of communication paths for communicating the data with the host system. The method 300 may also include defining a routing instruction in response to the selected communication path, as shown at block 306. At block 308, the method 300 includes communicating the routing instruction in a TLP to an IIO module of the host system. The method 300 may also include routing the data from the peripheral device to either the processing device or the memory device according to the routing instruction, as shown at block 310.

One of ordinary skill will also recognize that the functional blocks of the method 300 illustrated in FIG. 3 may be implemented in one or more functional modules. As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. Steps or elements of the methods described in FIG. 3 may be performed by one or more components of the systems of FIG. 5 described below, including the IO manager 502, the Fast IO PCIe Device 514 and the host system 102. For example, the IO manager 502 may receive the IO request as shown at block 302. Additionally, the IO manager 502 may analyze the information from the IO request at block 304. The fast IO PCIe device 514 may communicate the routing instruction in the TLP packet to the host system 102, as shown at block 308. The host system 102 may route the data as shown at block 310.

FIG. 4A is a logical diagram illustrating an embodiment of fast IO mode 402 on PCIe devices. In the fast IO mode 402, a software application 404 may generate an IO request and communicate the request to an IO device 406. The IO device 406 may communicate the request to the host system 102. In such an embodiment, an integrated IO (IIO) module 410 may receive the request and determine whether to communicate the request with the memory controller 412 or with the last level cache (LLC) associated with the CPU core 202. If the request includes data characteristics that require urgent communication of the IO request, then the request may be sent to the LLC 414. If the IO request is not urgent, or if greater data throughput is required, then the IIO module 410 may send the IO request to the memory controller 412. In such an embodiment, the data from the IO request may be communicated with the memory 108. Thus, two possible data paths are created, and may be dynamically available for handling IO requests, based on the data characteristic.

As used herein, the term "data characteristic" may include an explicit tag, indicator, setting, field value, user input, or the like, which indicates a level of urgency of the IO request. Alternatively, a data characteristic may be an inherent property of the IO request, such as identification and/or classification of the software application 404 that sent the IO request, the status of the LLC 414, port availability, or the like.

Figure 4B:
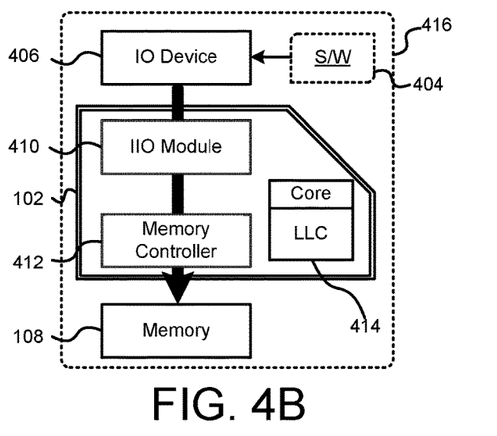
FIG. 4B is a logical diagram illustrating DMA IO on PCIe devices.
Figure 4C:
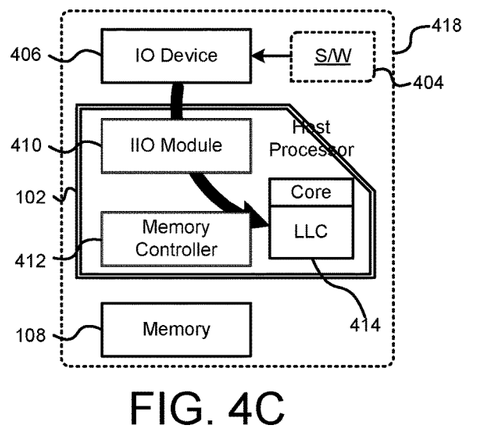
FIG. 4C is a logical diagram illustrating DDIO on PCIe devices.

FIG. 4B is a logical diagram illustrating DMA IO mode 416 on PCIe devices. In such an embodiment, the IO request is only communicated to the memory 108, because selected ports are configured for DMA IO handling. Conversely, FIG. 4C is a logical diagram illustrating DDIO on PCIe devices.

Figure 4D:
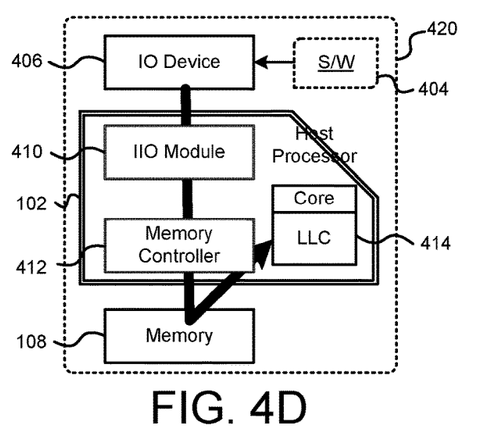
FIG. 4D is a logical diagram illustrating DCA IO on PCIe devices.

In the DDIO mode 418, IO requests are communicated directly to the LLC 414, or other CPU cache. FIG. 4D is a logical diagram illustrating DCA IO mode 420 on PCIe devices. In the DCA mode 420, the IO requests are initially sent to the memory 108, but a prefetch operation is triggered and the IO request is then communicated to the LLC 414 for more rapid processing.

Figure 5:
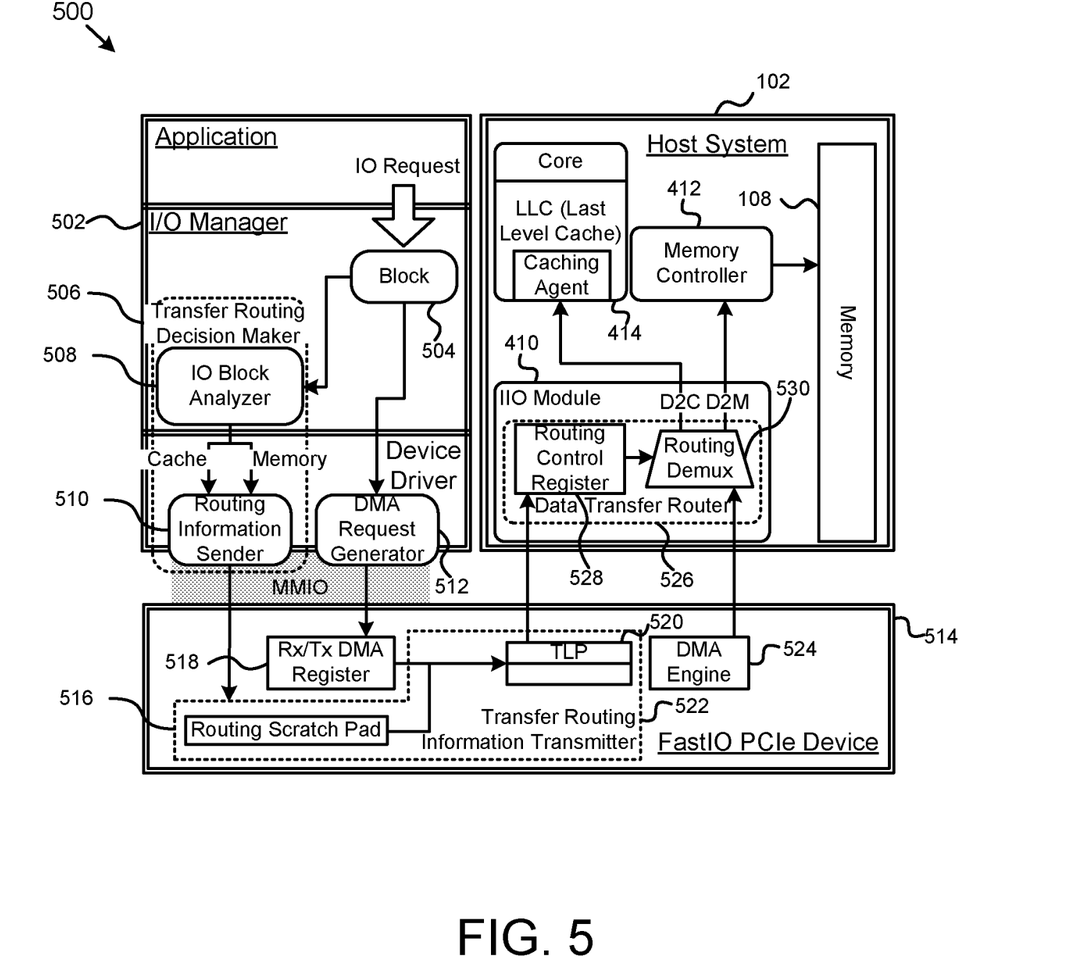
FIG. 5 is a logical diagram illustrating an embodiment of a system specially configured for fast IO on PCIe devices.

FIG. 5 is a logical diagram illustrating an embodiment of a system 500 specially configured for fast IO on PCIe devices. In an embodiment, an application sends an IO request to an IO manager 502. The IO request is then converted to a block 504 in the IO manager 502, in order to send the IO request to the IO devices through a DMA request generator 512 in the device driver. Additionally, block information may be forwarded to the IO block analyzer 508 in the transfer routing decision maker 506. The IO block analyzer 508 may classify the block 504 into one of two categories: transfers to cache and transfers to memory. In order to classify a block 504, the IO block analyzer 508 may employ various mechanisms such as user hints, the type of block 504, for example, whether the block is a user requested block or prefetch block, LLC status, user priority, and so on. In a further embodiment, these criteria may be combined for the classification. Once the block is classified by the IO block analyzer 508, the routing information is delivered to a transfer routing information transmitter 522 in the FastIO PCIe device 514 via a routing information sender 510. The term "FastIO PCIe deivce" refers to a PCIe device capable executing at least portions of the fast IO processes described herein, and in a specific embodiment is illustrated as item 514 in FIG. 5. If, however, the routing information is the same to that of the previously transferred block, then the step of communicating the routing information may be skipped.

In an embodiment, the routing information is transferred before transfer of the DMA request from the DMA request generator 512 to the Rx/Tx DMA register 518 in the FastIO PCIe device 514. In one embodiment, a routing scratch pad 516 in the transfer routing information transmitter 522 may store the transfer routing information received from the routing information sender. When the FastIO PCIe device 514 builds a Transaction Layer Packet (TLP) 520, the transfer routing information may be embedded in the TLP and communicated to the IIO module 410.

In an embodiment, the IIO module 410 initializes a routing control register 528 in the data transfer router 526 using the routing information embedded in the TLP. The purpose of a TLP is to transfer DMA information such as memory address, size, and so on to the host system 102 for each DMA request. So, the DMA engine 524 sends data to IIO module 526 following TLP transfer. The data is transferred to the destination which is stored in the routing control register by the routing demultiplexer (demux) 530, which is controlled by the routing information from the TLP stored in the routing control register 528. The data may be communicated to either the LLC 414 or to the memory 108 via the memory controller 412.

Figure 6:
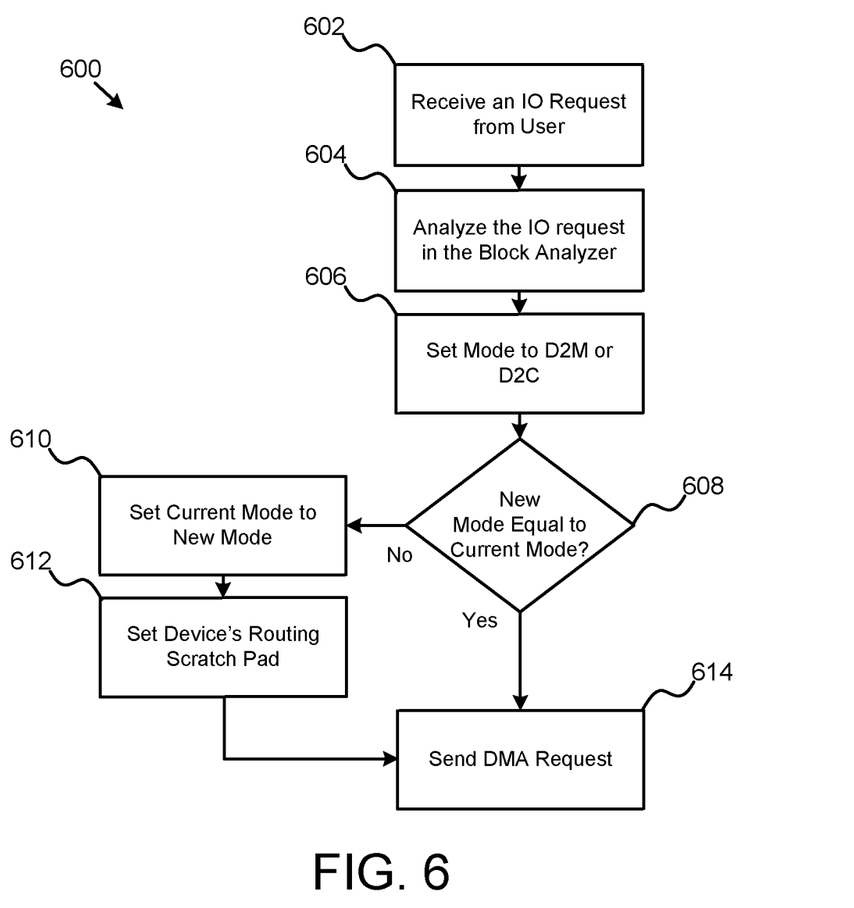
FIG. 6 is a schematic flowchart diagram illustrating an embodiment of a method for fast IO on PCIe devices.

FIG. 6 is a schematic flowchart diagram illustrating an embodiment of a method 600 for fast IO on PCIe devices. Aspects of the method 600 may be performed by one or more components of the IO Manager 502. In an embodiment, the method 600 includes receiving an IO request from a user application by the IO manager 502, as shown at block 602. At block 604, the IO block analyzer 508 may analyze the block to determine a required transfer mode. The IO block analyzer 508 may then set the mode to device to memory (D2M) or device to cache (D2C) mode, depending upon the data characteristic, as shown at block 606. At block 608 it is determined whether the new mode is equal to the currently set mode for the system. If so, then the DMA request is sent by the DMA request generator 512 at block 614. If not, the current mode is set to the new mode at block 610 and the device routing scratch pad 516 is updated by the routing information sender 510 at block 612, then the DMA request is sent by the DMA request generator 512 at block 614.

Figure 7:
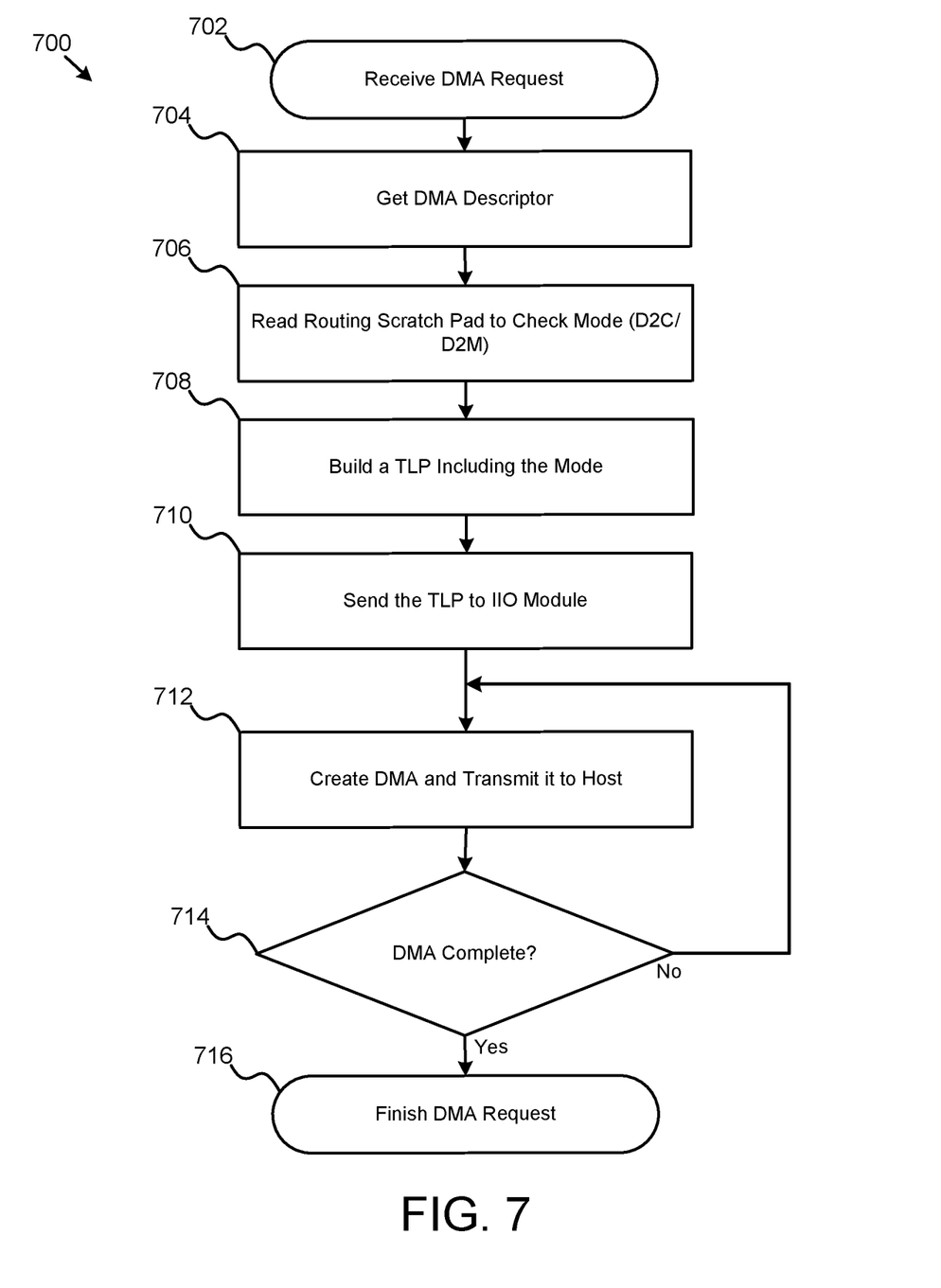
FIG. 7 is a schematic flowchart diagram illustrating an embodiment of a method for fast IO on PCIe devices.

FIG. 7 is a schematic flowchart diagram illustrating an embodiment of a method 700 for fast IO on PCIe devices. Aspects of the method 700 may be performed by the FastIO PCIe device 514. In an embodiment, the method 700 includes receiving a DMA request 702 with a Rx/Tx DMA register 518. A DMA descriptor may be received by the Rx/Tx DMA register 518, and the transfer routing information transmitter 522 may retrieve the DMA descriptor at block 704. Additionally, the transfer routing information transmitter 522 may read the routing scratch pad 516 to check whether the mode of transfer is D2C or D2M at block 706. At block 708, the transfer routing information transmitter 522 may build a TLP that includes information about the transfer mode. At block 710, the transfer routing information transmitter 522 may send the TLP to the IIO module 526. The DMA engine 524 may then create the DMA and transmit it to the host system 102, as shown at block 712. If the DMA is complete at block 714, then the DMA request may be finished at block 716. If not, the DMA engine 524 may continue to create DMA data and transmit it to the host system 102 until the DMA is complete.

Figure 8:
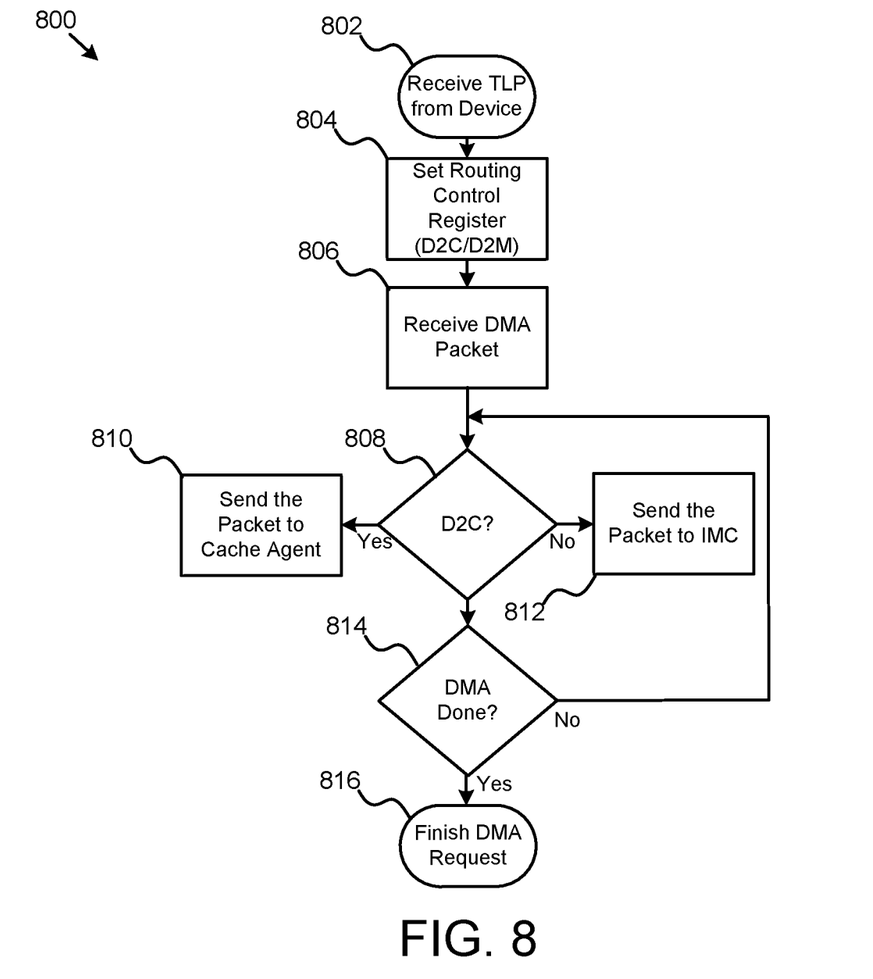
FIG. 8 is a schematic flowchart diagram illustrating an embodiment of a method for fast IO on PCIe devices.

FIG. 8 is a schematic flowchart diagram illustrating an embodiment of a method 800 for fast IO on PCIe devices. Aspects of the method 800 may be performed by components of the host system 102, including the IIO module 526. In an embodiment, the method 800 may include receiving a TLP from the FastIO PCIe device 514 at block 802. At block 804, the method 800 may include setting the routing control register 528 to a value that indicates D2C routing, or to a value that indicates D2M routing. At block 806, the data transfer router 526 may receive the DMA packet from the FastIO PCIe device 514. If, at block 808, the routing control register 528 is set to D2C, then the DMA packet may be sent by the routing demux 530 to the caching agent in the LLC 414 as shown at block 810. If not, then the routing demux 530 may send the DMA packet to the memory controller 412, as shown at block 812. If the DMA is complete at block 814, then the DMA request may be finished at block 816. Otherwise the DMA packets may be repeatedly sent to either the cache agent in the LLC 414 or the memory controller 412 as defined by the routing control register 528 until the DMA is complete at block 814.

Figure 9:
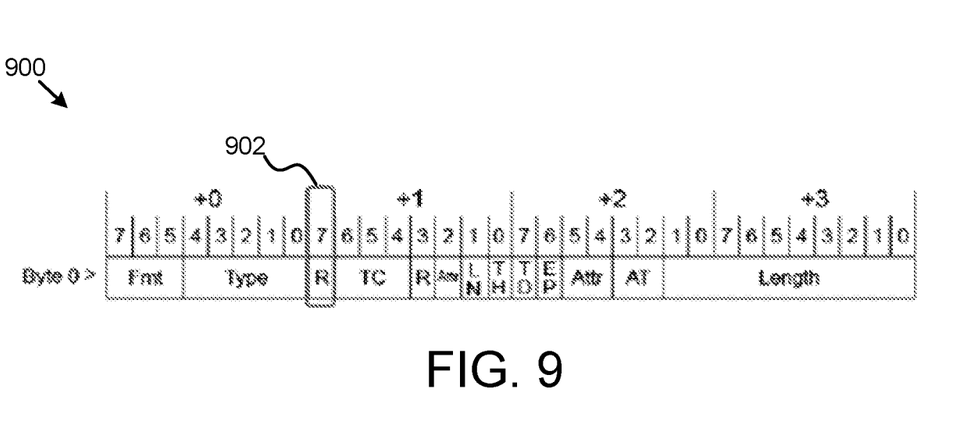
FIG. 9 is a logical diagram illustrating one embodiment of a transaction layer packet (TLP).

FIG. 9 illustrates an embodiment of a transfer layer packet (TLP) which may be modified for use according to the present embodiments. The TLP may include a reserve bit 902, in one embodiment. In such an embodiment, the reserve bit 902 may be assigned a value by the routing information transmitter 522 based on the routing information stored in the routing scratch pad 516. In an embodiment, a "0" bit value may indicate that the DMA is to be sent to the memory 108, and a "1" bit value may indicate that the DMA is to be sent to the LLC 414.

Figure 10:
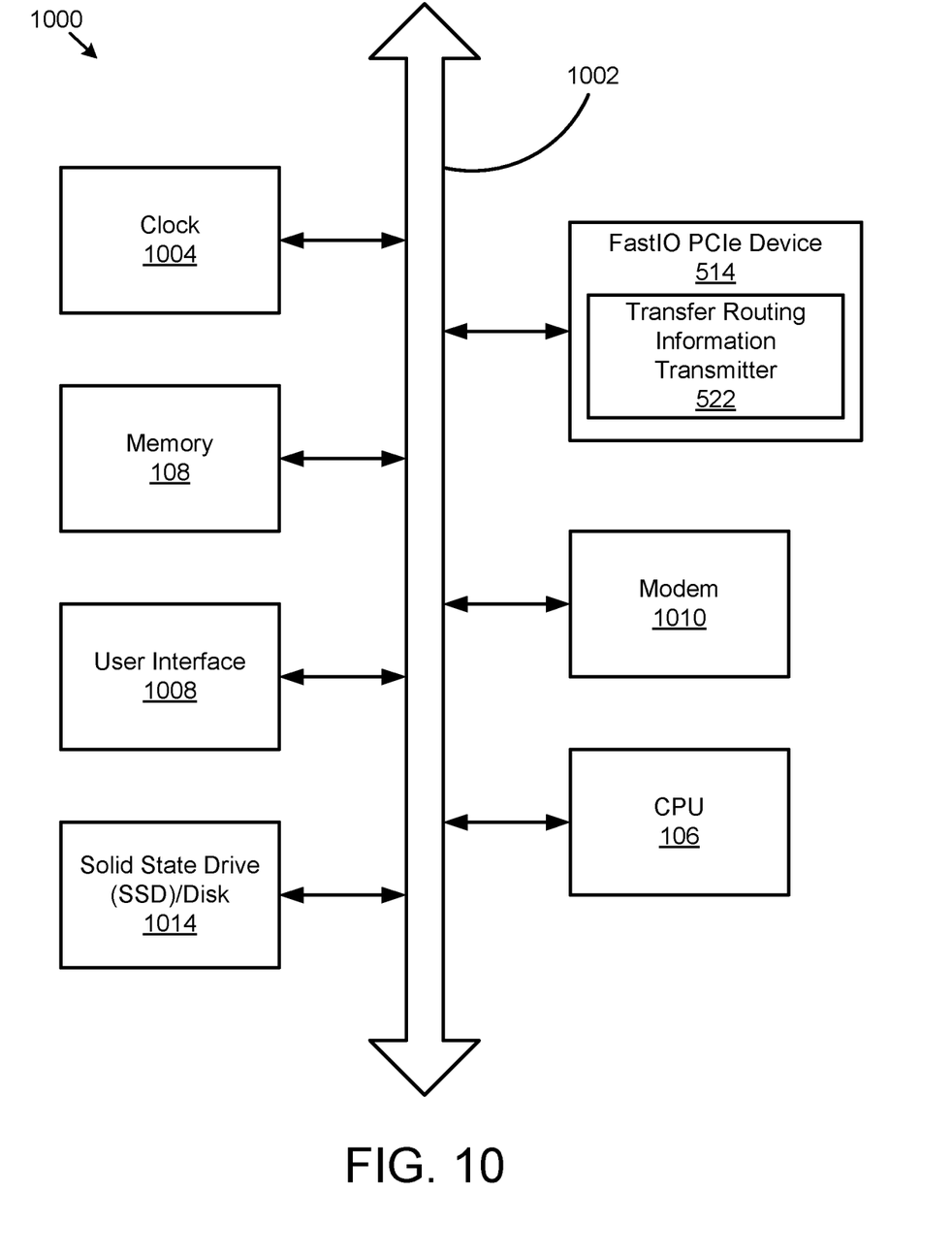
FIG. 10 is a block diagram of a computing system specially configured according to the present embodiments.

FIG. 10 is a block diagram of a computing system 1000 including the FastIO PCIe device 514 having the transfer routing information transmitter 522 of FIG. 5. The computing system 1000 can include a clock 1004, a memory 108, such as random access memory (RAM), a user interface 1008, a modem 1010 such as a baseband chipset, a solid state drive/disk (SSD) 1014, and/or a processor, such as CPU 106, any or all of which may be electrically coupled to a system bus 1002. The computing system 1000 can include the FastIO PCIe device 514 having the transfer routing information transmitter 522 of FIG. 5, which may also be electrically coupled to the system bus 1002. The space compaction engine 145 can include or otherwise interface with the clock 1004, the memory 108, the user interface 1008, the modem 1010, the solid state drive/disk (SSD) 1014, and/or the CPU 106.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

The invention claimed is:

1. A method for performing fast input/output (IO) on data handling devices, comprising:
   receiving an Input/Output (IO) request from a software application, the IO request comprising instructions for communicating data between a peripheral device and a host system, the host system comprising a data processing device and a memory device;
   analyzing information from the IO request by an IO block analyzer to select one of a plurality of communication paths for communicating the data with the host system, wherein the plurality of communication paths include a first communication path for communicating the data from the peripheral device to a cache associated with the data processing device and a second communication path for communicating the data from the peripheral device to the memory device;
   generating a routing instruction by a transfer routing decision maker in response to the selected communication path of the first communication path and the second communication path;
   associating the routing instruction with a packet by a transfer routing information transmitter;
   communicating the routing instruction of the packet to an integrated IO (IIO) module of the host system; and
   routing the data from the peripheral device to one of the data processing device and the memory device according to the routing instruction by a data transfer router;
   wherein the data processing device comprises a central processing unit (CPU).

2. The method of claim 1, wherein the data is communicated along the first communication path according to a Direct Data IO (DDIO) protocol.

3. The method of claim 1, wherein the data is communicated along the second communication path according to a Direct Memory Access (DMA) protocol.

4. The method of claim 1, further comprising storing, before the associating of the routing instruction, the routing instruction in a routing scratch pad of a data transfer device coupled to the host system.

5. The method of claim 4, wherein the communicating of the routing instruction includes communicating the routing instruction from the data transfer device to a routing control register of the IIO module.

6. The method of claim 5, wherein the associating of the routing instruction with the packet comprises setting a routing control bit in the packet according to the routing instruction stored in the routing scratch pad.

7. The method of claim 2, wherein the data communicated along the first communication path has a first data characteristic.

8. The method of claim 5, wherein the data communicated along the second communication path has a second data characteristic.

9. A system for performing fast input/output (IO) on data handling devices, comprising:
 a peripheral device comprising an Input/Output (IO) manager to:
  receive an Input/Output (IO) request, the IO request comprising instructions for communicating data between the peripheral device and a host system, the host system comprising a data processing device and a memory device;
  analyze information from the IO request to select one of a plurality of communication paths for communicating the data with the host system, wherein the plurality of communication paths include a first communication path for communicating the data from the peripheral device to a cache associated with the data processing device and a second communication path for communicating the data from the peripheral device to the memory device; and
  generate a routing instruction in response to the selected communication path; and a data transfer device, coupled to the peripheral device, associating the routing instruction with a packet and communicating the routing instruction associated with the packet to an integrated IO (IIO) module of the host system;
 wherein the data processing device comprises a central processing unit (CPU).

10. The system of claim 9, wherein the host system is configured to communicate the data along the first communication path according to a Direct Data IO (DDIO) protocol.

11. The system of claim 10, wherein the host system is configured to communicate the data along the second communication path according to a Direct Memory Access (DMA) protocol.

12. The system of claim 9, wherein the data transfer device is configured to store, before the associating of the routing instruction with the packet, the routing instruction in a routing scratch pad of the data transfer device coupled to the host system.

13. The system of claim 12, wherein the data transfer device is configured to communicate the routing instruction associated with the packet to a routing control register of the IIO module.

14. The system of claim 13, wherein the data transfer device is configured to set a routing control bit in the packet according to the routing instruction stored in the routing scratch pad.

15. The system of claim 13, wherein the host system further comprises a routing demultiplexer configured to communicate data having a first data characteristic to the data processing device.

16. The system of claim 14, wherein the host system further comprises a routing demultiplexer configured to communicate data having a second data characteristic to the memory device according to the routing instruction stored in the routing control register.

17. An apparatus for performing fast input/output (IO) on data handling devices, comprising:
 a data transfer device coupled to a peripheral device and configured to generate and communicate a routing instruction associated with a packet to an integrated IO (IIO) module of a host system,
 wherein the routing instruction comprises a selection of one of a plurality of communication paths for communicating data between the peripheral device and the host system, the selection being determined in response to instructions included in an IO request,
 wherein the plurality of communication paths include a first communication path for communicating the data from the peripheral device to a cache associated with the data transfer device and a second communication path for communicating the data from the peripheral device to a memory device;
 wherein the data transfer device comprises a central processing unit (CPU).

18. The apparatus of claim 17, further comprising a routing scratch pad configured to store the routing instruction.

19. The apparatus of claim 18, further comprising a transfer routing information transmitter configured to set a reserved field of the packet to the routing instruction stored in the routing scratch pad.

20. The apparatus of claim 19, further comprising a DMA engine configured to generate DMA data to be sent to the IIO module of the host system,
 wherein the IIO module is configured to route the DMA data according to the routing instruction of the packet.

* * * * *